(12) United States Patent
Hishinuma

(10) Patent No.: US 8,016,101 B2  
(45) Date of Patent: Sep. 13, 2011

(54) BELT JUNCTION CONVEYOR

(75) Inventor: Nobuya Hishinuma, Yokohama (JP)

(73) Assignee: Sanki Engineering Co., Ltd, Tokyo (JP)

( * ) Notice: Subject to any disclaimer, the term of this patent is extended or adjusted under 35 U.S.C. 154(b) by 12 days.

(21) Appl. No.: 12/666,111

(22) PCT Filed: Jun. 25, 2008

(86) PCT No.: PCT/JP2008/001652  
§ 371 (c)(1), (2), (4) Date: Feb. 5, 2010

(87) PCT Pub. No.: WO2009/001556  
PCT Pub. Date: Dec. 31, 2008

(65) Prior Publication Data  
US 2010/0181166 A1   Jul. 22, 2010

(30) Foreign Application Priority Data

Jun. 26, 2007 (JP) ................. 2007-167094  
May 2, 2008 (JP) ................. 2008-120347

(51) Int. Cl.  
B65G 15/60   (2006.01)

(52) U.S. Cl. ................... 198/839; 198/369.2

(58) Field of Classification Search ........... 198/369.2, 198/369.3, 369.5, 831, 839, 861.2  
See application file for complete search history.

(56) References Cited

U.S. PATENT DOCUMENTS

| | | | | |
|---|---|---|---|---|
| 1,930,318 A | * | 10/1933 | Mojonnier | 198/831 |
| 2,241,219 A | * | 5/1941 | Plausics | 198/839 |
| 5,168,978 A | * | 12/1992 | Cox et al. | 198/369.5 |
| 5,188,210 A | * | 2/1993 | Malow | 198/369.5 |
| 7,431,149 B2 | * | 10/2008 | Hishinuma | 198/831 |
| 2005/0205392 A1 | | 9/2005 | Hishinuma | |

FOREIGN PATENT DOCUMENTS

| | | |
|---|---|---|
| JP | 033626/1982 | 2/1982 |
| JP | 60082524 A | 5/1985 |
| JP | 04221/1993 | 6/1993 |
| JP | 2004-035241 A | 2/2004 |
| JP | 2005-263386 A | 9/2005 |
| JP | 2006-008279 A | 1/2006 |

* cited by examiner

*Primary Examiner* — James R Bidwell  
(74) *Attorney, Agent, or Firm* — Winstead PC

(57) ABSTRACT

A change-over mechanism causing a main support frame and a sub support frame to rotate is made up of a drive motor, a rotating body, and coupling rods. One end of the coupling rod is coupled to the rotating body, and the other end thereof is coupled to the main support frame. One end of the coupling rod is coupled to the rotating body, and the other end thereof is coupled to the sub support frame. When a belt junction conveyor is changed over between a first and a second transfer states, one of the coupling rods is pushed out and the other one is pulled by the rotating body rotating by an activation of the drive motor, so that the main and the sub support frames are rotated in the opposite direction from each other, and a direction of transport of products by an endless belt is changed over.

14 Claims, 11 Drawing Sheets

BELT JUNCTION CONVEYOR

CROSS-REFERENCE TO RELATED APPLICATIONS

This application is a U.S. National Stage filing of International Application Number PCT/JP2008/001652, filed on Jun. 25, 2008. PCT/JP2008/001652 claims priority from Japanese Patent Application Numbers 2007-167094, filed on Jun. 26, 2007 and 2008-120347, filed on May 2, 2008. PCT/JP2008/001652, Japanese Patent Application Number 2007-167094 and Japanese Patent Application Number 2008-120347 are incorporated herein by reference.

TECHNICAL FIELD

The present invention relates to a belt junction conveyor configured to assort products being transported by a belt conveyor and, specifically, to a belt junction conveyor configured to assort the products by rotating a transport conveyor part for transporting the products to the left and right.

BACKGROUND ART

Conventionally, products such as airport baggage or mail articles are generally assorted by a belt conveyor while the products are in the course of being transported. As a method of assorting the products in the course of being transported, for example, a method in which a branching arm is arranged at a branched portion between a belt conveyor in a main stream and a belt conveyor branched from the belt conveyor in the main stream and the products are assorted by rotating or not rotating the branching arm, and a method in which a pusher is arranged at the branched portion described above and the products are assorted depending on whether the products are pushed out by the pusher or not are proposed (for example, Patent Document 1).
Patent Document 1: Japanese Unexamined Patent Application Publication No. 2006-008279

DISCLOSURE

Problems to be Solved

However, when the products are assorted by rotating or not rotating the branching arm as described above, there are such disadvantages that the products may be damaged due to an impact applied when the products being transported by the belt conveyor in the main stream come into abutment with the branching arm, and transport or assortment cannot be proceeded smoothly because of being caught or wedged in a clearance defined between a lower end of the branching arm and an upper surface of the transport belt of the belt conveyor. The disadvantages as described above occur also when the pusher is used, an effective measure for assorting the products while being transported cannot be found in the present state.

The present invention is invented for solving the above-described problems, and it is a proposition of the present invention to provide a belt junction conveyor which does not impart an impact on products being transported from side surfaces or the like for preventing damages of the products and achieves stable and reliable assortment of the products being transported.

Means for Solving the Problems

A belt junction conveyor according to a first invention includes: an endless belt formed with a transport conveyor part for assorting products to be transported; a drive pulley configured to cause the endless belt wound therearound to travel; two redirecting members configured to redirect the endless belt wound around the drive pulley on an upstream side of the transport conveyor part in a direction of transport of the products so as to position the transport conveyor part on an upper surface; a tail pulley around which the endless belt after having been redirected by the two redirecting members is wound, a main support frame on which the drive pulley is rotatably mounted; a sub support frame on which the tail pulley is rotatably mounted; a first coupling rod one end of which is coupled to the main support frame; a second coupling rod one end of which is coupled to the sub support frame; a base frame on which the two redirecting members are mounted and to which the first coupling rod and the second coupling rod are axially coupled in a coaxial manner, in which the second coupling rod is disposed between the two redirecting members; and a change-over mechanism configured to change over the direction of transport of the products on the transport conveyor part by rotating the main support frame and the sub support frame in the directions opposite from each other by a predetermined amount, in which the change-over mechanism includes a drive motor configured to operate as an actuator, a rotating body configured to rotate by the operation of the drive motor, a first coupling member configured to couple the rotating body and the main supporting frame, and a second coupling member configured to couple the rotating body and the sub supporting frame.

A second invention according to the first invention, in which the two redirecting members are each made up of redirecting pulleys, and the redirecting pulleys are rotatably mounted on the base frame.

A third invention according to the first invention, in which the two redirecting members are made up of either cylindrical pipes or cylindrical shafts, respectively.

A fourth invention according to the third invention, in which the base frame is provided with an antivibration member which is brought into abutment with at least one of the cylindrical pipes which is arranged above the second coupling rod when the two redirecting member are made up respectively of the cylindrical pipes.

A fifth invention according to the first to fourth inventions, in which the endless belt includes semicircle salient parts or rounded thick edge parts on a surface which forms the upper surface of the transport conveyor part at both end edges in a direction of width of the endless belt, and is arranged with a plurality of holder units at positions in proximities of the end edges of the traveling endless belt, in which the plurality of holder units are configured to limit a relative position between the endless belt and the main support frame with respect to the direction of the width of the endless belt and a relative position between the endless belt and the sub support frame with respect to the direction of the width of the endless belt by coming into abutment resiliently with the thick edge parts and pressing the thick edge parts to end edge sides in the direction of the width of the endless belt to restrain meandering of the endless belt generated when the direction of transport of the products on the transport conveyor part is changed over.

A sixth invention according to the first to fourth inventions, in which the endless belt includes semicircle salient parts or rounded thick edge parts on a surface which forms the upper surface of the transport conveyor part at both end edges in a direction of width of the endless belt, and is arranged with at least one of holder units each at a position in a proximity of the one end edge and at a position in a proximity of the other end edge of the travelling endless belt, in which the holder units are configured to limit a relative position between the endless belt and the main support frame with respect to the direction of the width of the endless belt and a relative position between the endless belt and the sub support frame with respect to the direction of the width of the endless belt by coming into abutment resiliently with any one of the thick edge parts provided at both end edges in the direction of the width of the endless belt and pressing the thick edge part to end edge sides in the direction of the width of the endless belt to restrain meandering of the endless belt generated when the direction of transport of the products on the transport conveyor part is changed over.

A seventh invention according to any one of the first to sixth inventions, in which the drive pulley is rotated by a motor having a follow shaft, in which a center shaft of the drive pulley is fitted.

An eighth invention according to any one of the first to seventh inventions, in which the main support frame further includes an end pulley around which the endless belt is wound at an end opposite from the end where the redirecting member is arranged out of both ends of the transport conveyor part in the direction of transport of the products in addition to the end pulley described above, and a portion of the end pulley where at least the endless belt is wound is formed of aluminum material.

Effects

According to the belt junction conveyor in the present invention, the products can be assorted without using a pusher or a branching arm. In other words, since an impact from side surfaces of the products at the time of assortment using the branching arm or the pusher is prevented from being applied to the products, damage of the products is prevented and, in addition, the products are prevented from being wedged or caught by a clearance generated between a lower end of the branching arm and an upper surface of the transport belt, whereby stable assortment of the products is achieved. In addition, since equipment as the belt junction conveyor can be downsized by using the drive motor as the actuator in comparison with the case of employing other actuators, reduction of manufacturing cost of the belt junction conveyor is achieved. Further, adjustment of voltage to be supplied to the motor, adjustment of frequency of AC power, or adjustment of an operation speed in the operation of the actuator (adjustment of acceleration and deceleration) can be performed by using the drive motor, smooth operation which alleviates the impacts to the respective parts of the belt junction conveyor such as a link mechanism, the main support frame and the sub support frame to which the link mechanism is coupled. In addition, when changing over the state of the belt junction conveyor using the drive motor, stop of the driving of the drive motor is performed without stopping by the abutment with a stopper or the like, the impacts to the respective parts of the belt junction conveyor can be reduced, so that life times of the respective parts of the belt junction conveyor may be elongated, and generation of noises such as vibration noises or impact noises are prevented.

In addition, by abutting the wheel-shaped holder units mounted on the support frame of the belt junction conveyor against the semicircle salient parts or the rounded thick edge parts provided at both end edges of the endless belt of the belt junction conveyor, the endless belt is limited from shifting toward the center in direction of the width of the support frame. By this, a tendency of meandering generated when the portion which redirects the endless belt is twisted is restrained, so that stable traveling of the conveyor belt is achieved.

The drive pulley does not need a coupling or the like for coupling male and female revolving shafts by being rotated by the motor having the follow shaft to which the revolving shaft of the drive pulley is fitted. Also, by configuring a mechanism to rotate the drive pulley by the motor having the downsized follow shaft which has been downsized in the recent years by having the motor part and the drive transmitting part integrated therein, a center shaft of the drive pulley is slightly elongated and so what is needed is just to dispose only a motor in the main support frame by a torque arm mechanism. Therefore, the weight reduction of the apparatus by itself is achieved. In addition, by reducing the weight of the drive pulley rotating mechanism being apart from the center of rotation by a certain amount, moment of inertia of the main support frame is reduced when the main support frame is rotated, so that the load on the change-over mechanism is significantly reduced.

In addition, since the main support frame further includes the end pulley around which the endless belt is wound at the end opposite from the end where the redirecting member is arranged out of both ends of the transport conveyor part in the direction of transport of the products in addition to the drive pulley described above, and the portion of the end pulley where at least the endless belt is wound is formed of aluminum material, the weight of the end pulley which contributes most to the moment of inertia when the main support frame rotates and is located at a position farthest from the center of rotation is reduced, whereby the moment of inertia of the main support frame is reduced and the load on the change-over mechanism is significantly reduced.

DETAILED DESCRIPTION OF THE EMBODIMENTS

Figure 1:
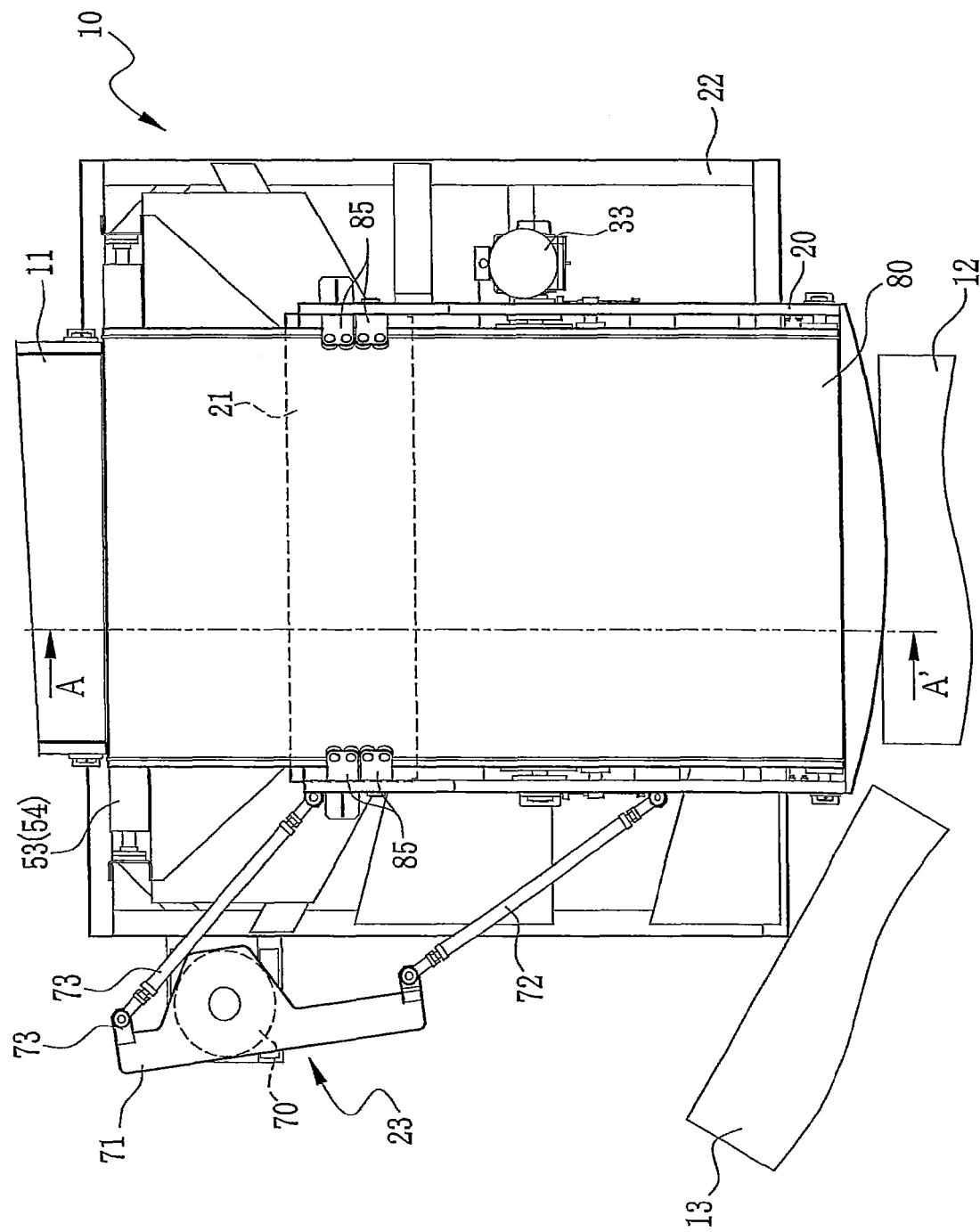
FIG. 1 is a top view showing a case where a belt junction conveyor assumes a first transfer state.
Figure 2:
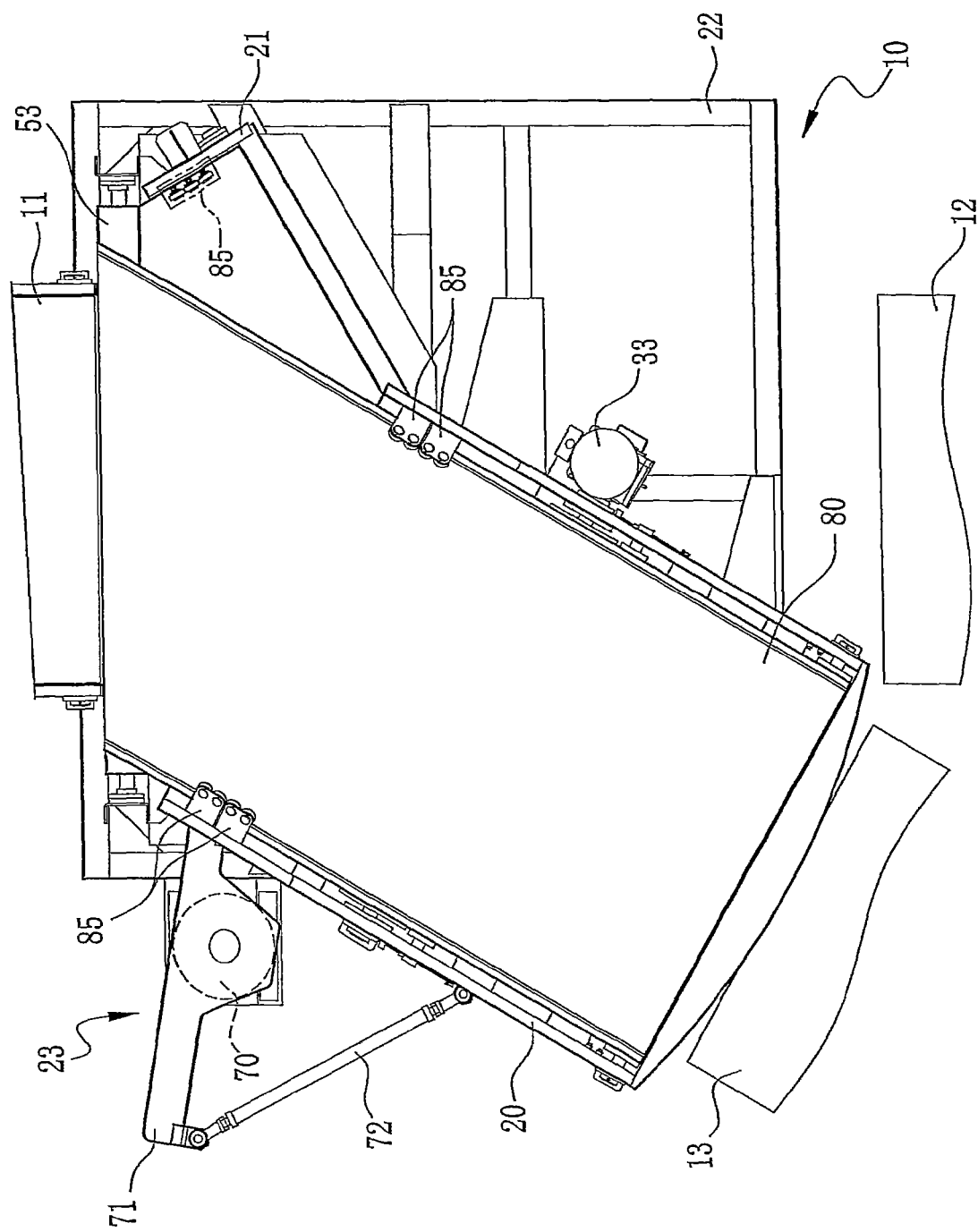
FIG. 2 is a top view showing a case where the belt junction conveyor assumes a second transfer state.
Figure 3:
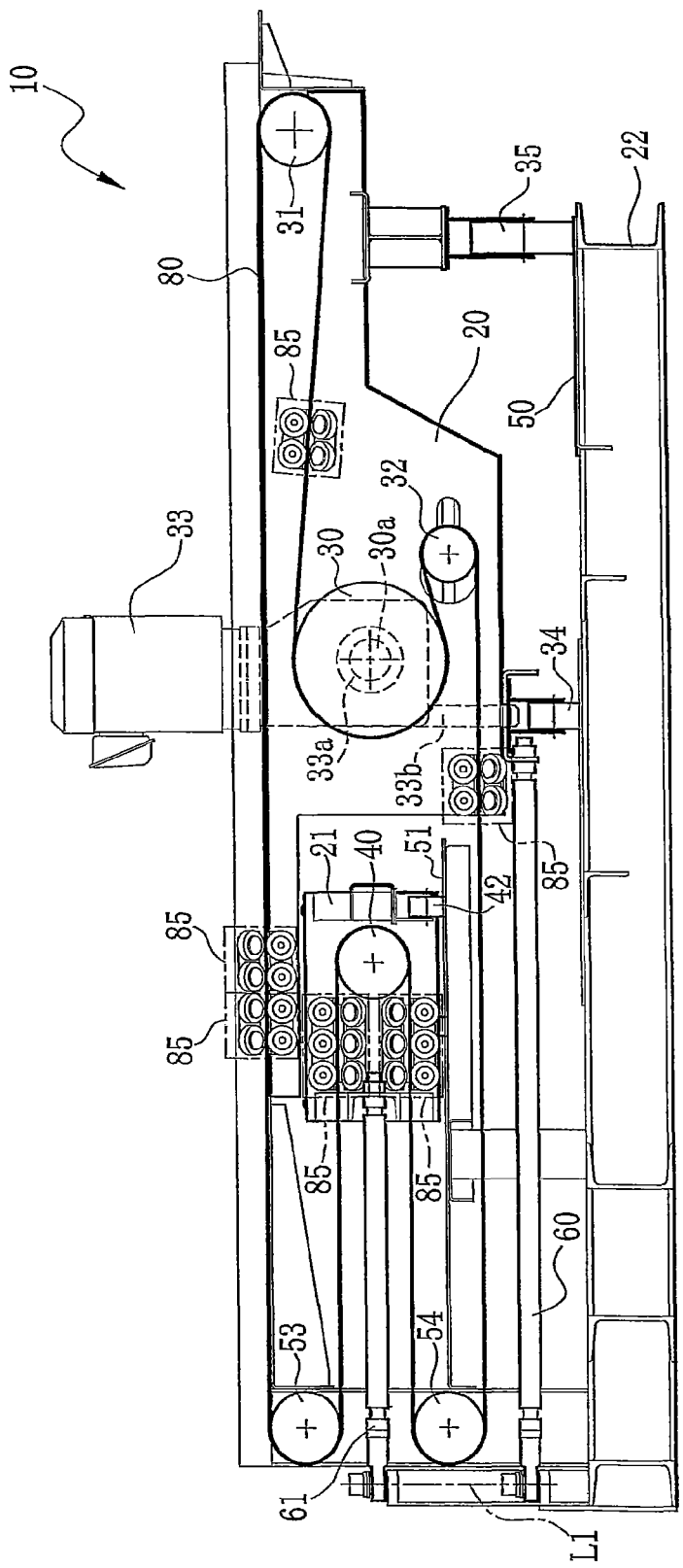
FIG. 3 is a cross-sectional view taken along a line A-A' in FIG. 1.

As shown in FIG. 1 to FIG. 3, a belt junction conveyor 10 according to the present invention is an apparatus configured to assort products being transported by transferring and receiving products transported by a belt conveyor 11 arranged on an upstream side after having changed over the direction of travel of a transport surface, and then transporting the same to one of a main stream belt conveyor 12 and a branched belt conveyor 13 provided on a downstream side. In the following description, a state of the belt junction conveyor 10 when transporting the products toward the main stream belt conveyor 12 is referred to as a first transfer state, and a state of the belt junction conveyor 10 when transporting the products to the branched belt conveyor 13 is referred to as a second transfer state. Further, the description will be given on the assumption that a main support frame 20 and a sub support frame 21, described later, are rotated by 30 degrees respectively in the opposite direction from each other when changing over the belt junction conveyor 10 between the first transfer state and the second transfer state. The belt junction conveyor 10 is provided with the main support frame 20, the sub support frame 21, a base frame 22, and a change-over mechanism 23.

The main support frame 20 is coupled with the base frame 22 via a coupling rod 60, described later, so as to be rotatable with respect to the base frame 22. In the main support frame 20, a drive pulley 30, an end pulley 31, and a take-up pulley 32 are rotatably supported, respectively, and at the same time, they are axially supported so that directions of axes thereof lie in parallel with each other.

The drive pulley 30 is arranged at a position substantially a center of the main support frame 20 in the direction orthogonal to a direction of width of the main support frame 20. A center axis of the drive pulley 30 is fitted at one end thereof to a follow shaft 33a provided on a drive motor 33. Accordingly, coupling or the like for coupling male and female revolving shafts is no longer necessary and, in addition, by utilizing the drive motor 33 provided with the compact follow shaft 33a having a motor part and a drive transmitting part integrally with each other, the weight of the main support frame 20 is reduced, and moment of inertia of the main support frame 20 at the time of rotation is reduced.

The end pulley 31 is arranged at one end side (right end in FIG. 3) of the main support frame 20 in the direction orthogonal to the direction of the width of the main support frame 20. The end pulley 31 is preferably made up of a pulley having an aluminum tube portion. As described later, the weight of a distal end of the main support frame which contributes to the moment of inertia of the rotating main support frame 20 is reduced and hence a load of a change-over mechanism is reduced. The take-up pulley 32 is provided for preventing sagging of a traveling endless belt 80 due to deterioration with age.

The drive motor 33 for rotating the drive pulley 30 is provided on a side surface of the main support frame 20 by which these pulleys are axially supported. The drive motor 33 integrally includes a drive part for converting a direction of rotation of the revolving shafts of the motor, and the drive part includes the follow shaft 33a for allowing a revolving shaft 30a of the drive pulley 30 to be fitted therein in the direction orthogonal to the revolving shafts of the motor. As shown in FIG. 3, the drive motor 33 is fixed so as to have a slight play around the follow shaft 33a by a torque arm 33b configured to be caught on a lower surface of the main support frame 20 via a pin. With such a method of fixation, the drive motor 33 is prevented from rotating by itself when it is operated, and is fixed to the main support frame 20. Accordingly, damage of the follow shaft 33a of the drive motor 33 due to direct transmission of shaking of the revolving shaft 30a of the drive pulley 30, which occurs when it is fixed to the main support frame 20 with a bolt firmly without providing the play and without using the torque arm 33b, is prevented.

In addition, a coupling rod 72, described later, is coupled to the side surface of the main support frame 20, which is an opposite side from the side surface where the drive motor 33 is provided. Further, casters 34 and 35 are provided on the lower surface of the main support frame 20 so as to be capable of rotating about an axis L1 while coming into abutment with a panel surface of an upper surface (first stage 50 described later) provided on an upper surface of the base frame 22. With rotation of wheels of the casters 34 and 35, the main support frame 20 can be rotated stably with a small force. The main support frame 20 includes a coupling member extending in a direction parallel to the direction of width for joining both side surfaces of the main support frame 20, and an end of the coupling rod 60 is coupled to the coupling member in the vicinity of the caster 34. The number of casters does not necessarily have to be limited to three, and may be provided at four corners of the main support frame in such a manner that extensions of the axes of rotations wheels of the respective casters pass the axis L1.

The sub support frame 21 is coupled with the base frame 22 via a coupling rod 61, described later, so as to be rotatable with respect to the base frame 22 and so that a center of rotation thereof matches that of the main support frame 20. The sub support frame 21 includes a tail pulley 40. The tail pulley 40 is axially supported so as to be rotatable by the sub support frame 21 at an end on the opposite side from the end where the coupling rod 61 is coupled to the sub support frame 21 out of both ends of the sub support frame 21 in the direction orthogonal to the direction of the width and, in addition, so that the axial direction thereof matches the direction of the width of the sub support frame 21. Casters 42 are provided at three positions on the lower surface of the sub support frame 21 in such a manner that extensions of the axes of rotations wheels of the respective casters pass the axis L1. With these casters 42, the sub support frame 21 can be rotated stably.

The base frame 22 includes a first stage 50 on which the main support frame 20 is placed with the intermediary of the casters 34 and 35, and a second stage 51 on which the sub support frame 21 is placed with the intermediary of the casters 42. The base frame 22 includes redirecting rollers 53 and 54 axially supported by one end thereof in the direction orthogonal to the direction of the width so as to be rotatable. Out of these redirecting rollers, the redirecting roller 53 is axially supported so that the upper surface thereof is located at the same level as that of the end pulley 31, and a portion of the endless belt 80 extended between the redirecting roller 53 and the end pulley 31 forms an uppermost surface. The redirecting rollers 53 and 54 are arranged in the vertical direction in such a manner that the axial directions thereof match the direction of the width of the base frame 22 at a predetermined distance from each other.

One end of the coupling rod 60 is axially coupled to the one end of the base frame 22 in the direction orthogonal to the direction of the width at a position below the redirecting roller 54. The other end of the coupling rod 60 is coupled to the main support frame 20. One end of the coupling rod 61 is axially coupled to a portion between the redirecting rollers 53 and 54 coaxially (L1 in FIG. 3) with the coupling rod 60. The other end of the coupling rod 61 is coupled to the sub support frame 21.

The change-over mechanism 23 changes over the belt junction conveyor 10 between the first transfer state and the second transfer state. The change-over mechanism 23 includes a drive motor 70, a rotating body 71, the coupling rod 72, and a coupling rod 73. The drive motor 70 is made up, for example, of a servo motor generating a high power torque at the time of rotation. With the employment of the drive motor 70 as the servo motor, the rotating body can be rotated at a high speed, that is, the state of the belt junction conveyor 10 can be changed over quickly between the first transfer state and the second transfer state. Control of operation of the drive motor 70 is carried out by a control device, not shown.

The rotating body 71 is formed into a substantially rectangular plate shape. One end of each of the coupling rods 72 and 73 are axially coupled to the both ends of the rotating body 71. The rotating body 71 is axially coupled to a drive shaft of the drive motor 70 in such a manner that a length from a center of rotation thereof to an axially-coupled pin part 72a provided at the end of the coupling rod 72 which is axially coupled to the rotating body 71 is different from a length from the center of rotation thereof to an axially-coupled pin part 73a provided on the coupling rod 73 which is axially coupled to the rotating body 71.

The coupling rod 72 is provided so as to couple the rotating body 71 and the main support frame 20. As described above, the end of the coupling rod 72 is axially coupled to the rotating body 71 and the other end thereof is axially coupled to the side surface of the main support frame 20 so as to be capable of rotating in the horizontal direction, respectively.

The coupling rod 73 is provided so as to couple the rotating body 71 and the sub support frame 21. As described above, the end of the coupling rod 73 is coupled to the rotating body 71 and the other end thereof is coupled to the side surface of the sub support frame 21 so as to be capable of rotating in the horizontal direction, respectively.

The endless belt 80 is wound around pulleys mounted respectively on the main support frame 20 and the sub support frame 21. In other words, considering the drive pulley 30 as a starting point, the endless belt 80 is wound around the drive pulley 30 so as to be redirected toward the downstream side in a direction of transport of the transport surface on the upper surface of the belt junction conveyor 10, then wound around the end pulley 31 and the take-up pulley 32, respectively, so as to be redirected again toward the upstream side of the direction of transport of the transport surface on the upper surface of the belt junction conveyor 10. Then, the endless belt 80 redirected toward the upstream side of the direction of transport of the transport surface on the upper surface of the belt junction conveyor 10 is wound around the redirecting pulleys 53 and 54 so as to be redirected toward the downstream side of the direction of transport of the transport surface on the upper surface of the belt junction conveyor 10, and then is wound around the tail pulley 40 so as to be redirected toward the downstream side of the direction of transport of the transport surface on the upper surface of the belt junction conveyor 10, so that an endless shape is assumed over the surfaces of the pulleys.

An upper surface of the endless belt 80 wound around the pulleys extending between the redirecting pulley 53 and the end pulley 31 corresponds to a transport belt part for placing the products for assorting while transporting. The endless belt 80 is provided with thick edge parts 81 over an entire length in a direction of travel of the endless belt 80 at the both ends in the direction of the width of the endless belt 80 on the surface side which corresponds to the upper surface of the transport belt part in a state of being wound in the belt junction conveyor 10 (see FIG. 4).

Provided on the endless belt 80 at the both ends in the direction of the width thereof in the vicinities of parts redirected by the pulleys provided in the main support frame 20 and the pulleys provided in the sub support frame 21 are holder units 85.

Figure 4:
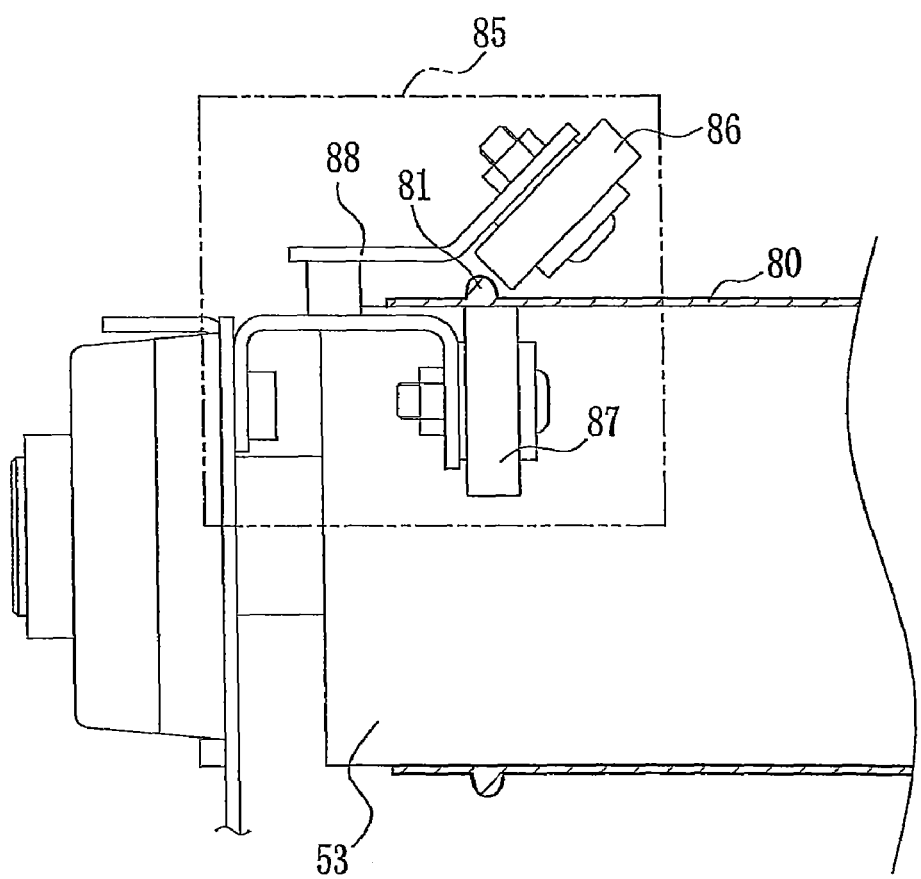
FIG. 4 is a cross-sectional view showing a configuration of a holder unit.

FIG. 4 is a drawing showing a configuration of the holder unit 85 arranged between the redirecting pulley 53 and the end pulley 31. The two holder units 85 in pair are arranged so as to interpose both ends of the endless belt 80 at positions where a imaginary line extending orthogonally to the direction of travel of the belt intersects belt edges therebetween. The holder unit 85 includes a plurality of wheels 86 arranged on a front surface side of the endless belt 80, and a plurality of wheels 87 arranged on a back surface side of the endless belt 80.

The wheels 86 which are arranged on the front surface side of the endless belt 80 from these wheels are arranged so as to be inclined toward the ends in the direction of the width of the endless belt 80. The wheels 86 press the thick edge parts 81 with vectors both in the direction of the wheels 87 located below and in the direction outward of the belt edges by rotating while being in abutment with the thick edge parts 81 provided on the endless belt, and press the same in the directions outward of the belt edges opposed from each other to stretch the belt in the direction of the width, thereby restraining the edges from moving toward the center of the belt. Accordingly, the endless belt 80 is prevented from meandering.

In contrast, the wheels 87 arranged on the back surface side of the endless belt 80 are arranged vertically to the endless belt 80. Reference numeral 88 designates leaf springs which the wheels 87 are rotatably mounted on and serves to press the wheels 86 obliquely downward strongly by their own flexible restoring forces if the wheels 86 climb up the thick edge parts 81 to a portion near the top when the edges of the endless belt 80 are moving toward the center of the belt irrespective of the outward pressing by the wheels 86 in the normal state, thereby strongly pressing the thick edge parts 81 further outward. The number of the wheels 86 and 87 provided in the holder unit 85 may be different depending on the positions where they are arranged, or may be the same.

Figure 5:
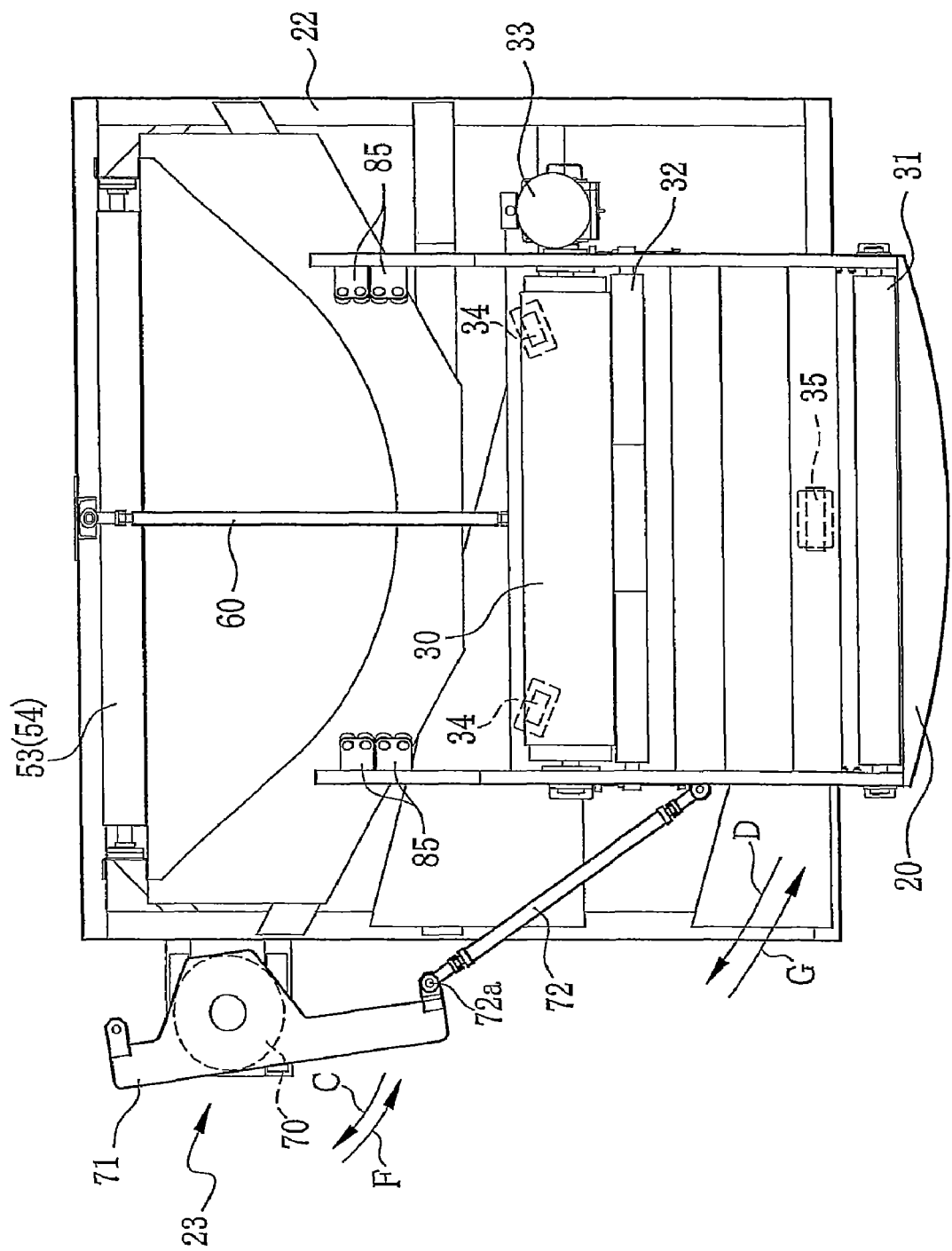
FIG. 5 is a top view showing a positional relationship between a main support frame and a rotating body when the belt junction conveyor assumes the first transfer state.
Figure 6:
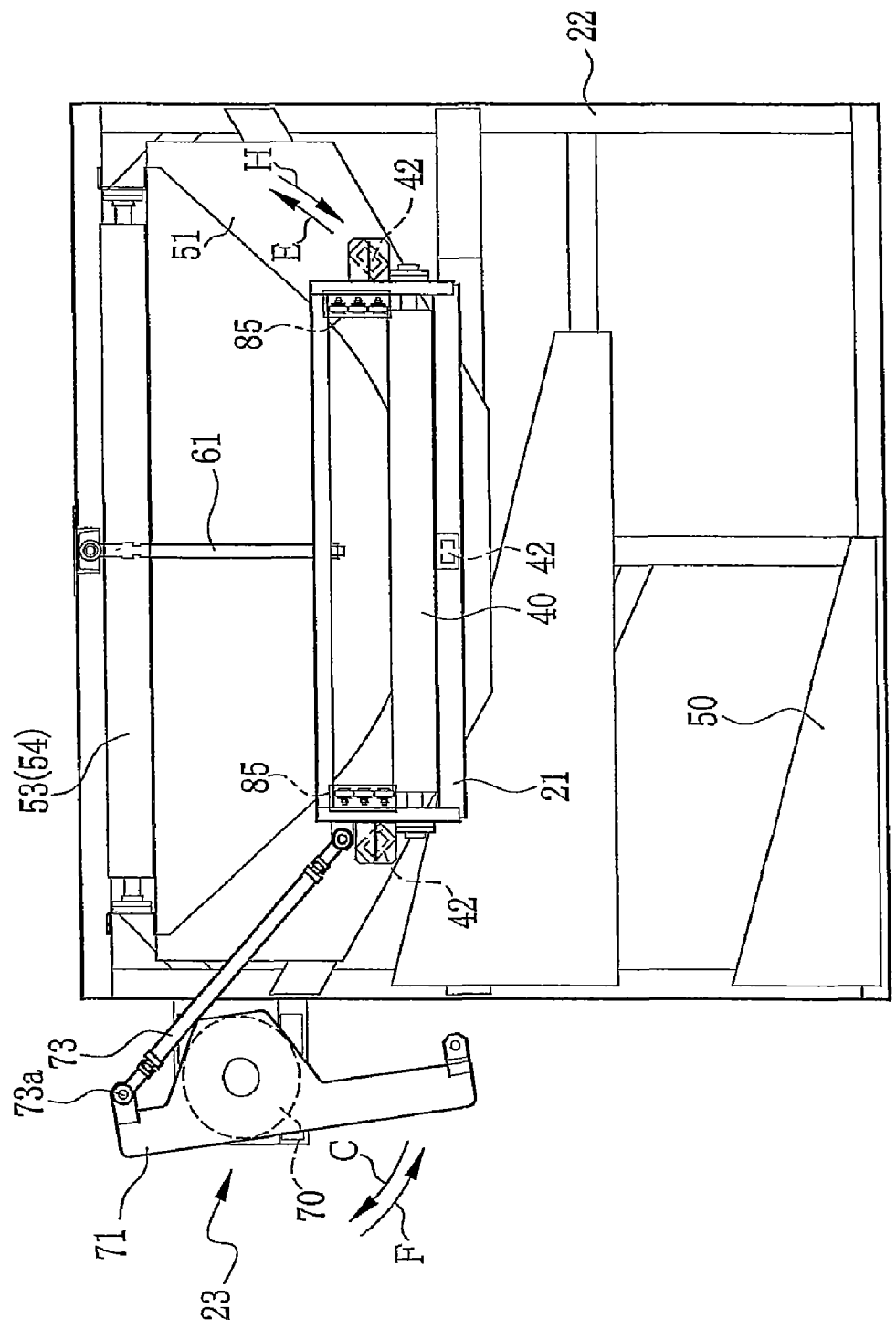
FIG. 6 is a top view showing a positional relationship between a sub support frame and the rotating body when the belt junction conveyor assumes the first transfer state.
Figure 7:
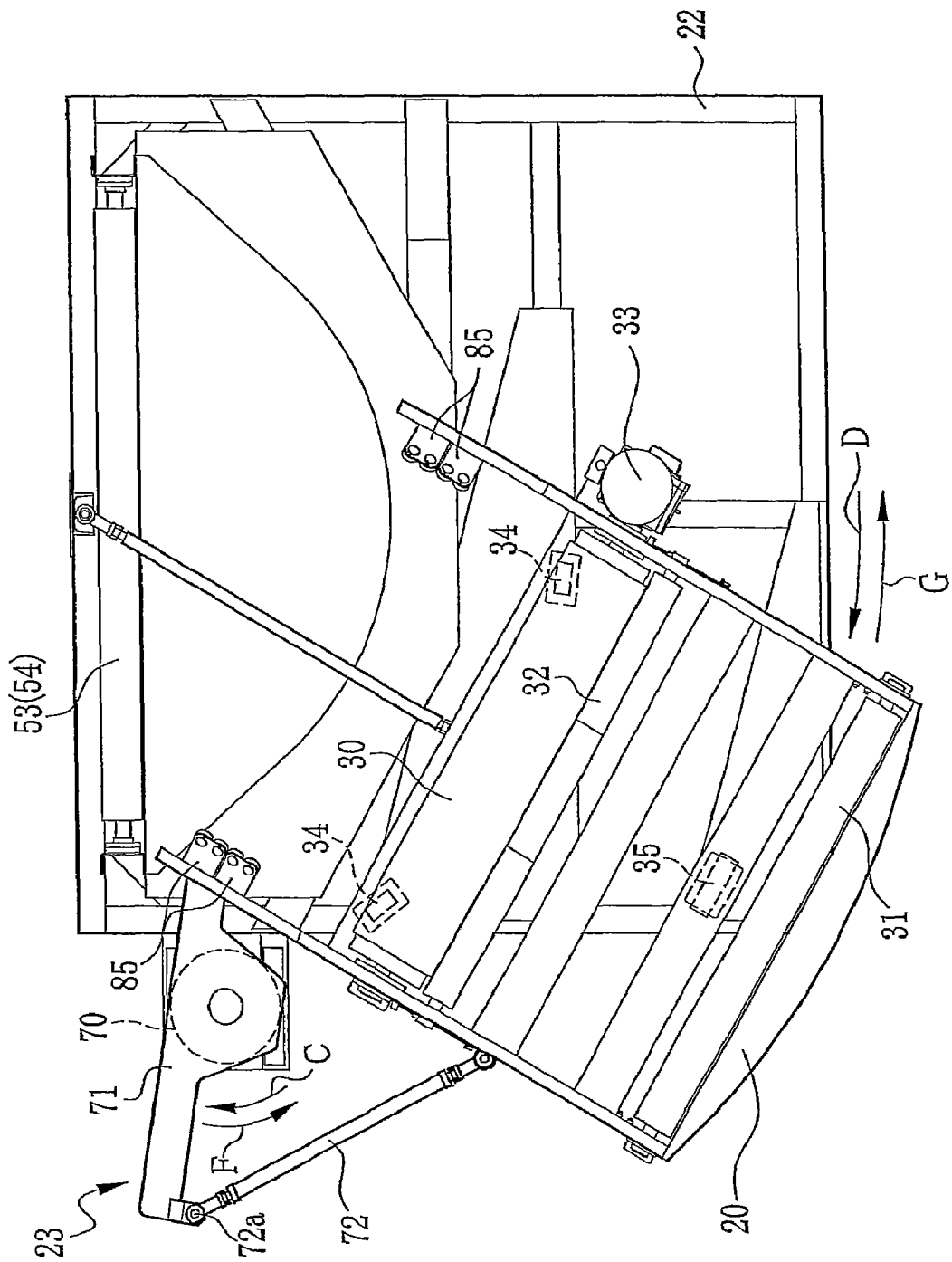
FIG. 7 is a top view showing a positional relationship between the main support frame and the rotating body when the belt junction conveyor assumes a second transfer state.
Figure 8:
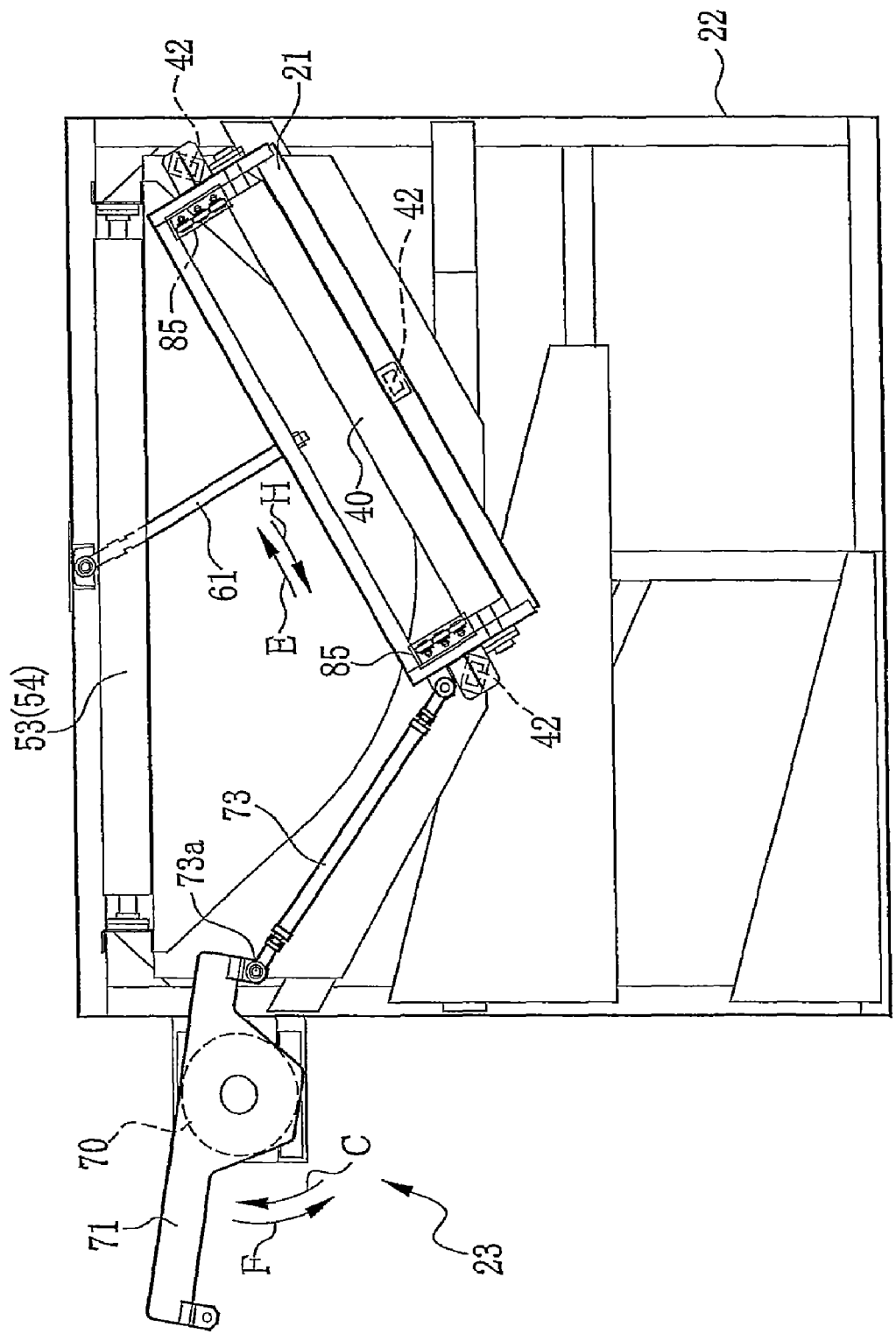
FIG. 8 is a top view showing a positional relationship between the sub support frame and the rotating body when the belt junction conveyor assumes the second transfer state.

Subsequently, an operation of the belt junction conveyor 10 configured as described above will be described. FIG. 5 is a drawing for explaining the main support frame 20 which is brought into the first transfer state, FIG. 6 is a drawing for explaining the sub support frame 21 which is brought into the first transfer state, FIG. 7 is a drawing for explaining the main support frame 20 which is brought into the second transfer state, and FIG. 8 is a drawing for explaining the sub support frame 21 which is brought into the second transfer state. For the purpose of avoiding complication of the drawings, the endless belt 80 and the sub support frame 21 are omitted in FIG. 5 and FIG. 7, and the endless belt 80 and the main support frame 20 are omitted in FIG. 6 and FIG. 8. The main support frame 20 and the sub support frame 21 rotate about an identical center of rotation, and the directions of rotation thereof are described by designating different alphabets.

When the belt junction conveyor 10 is brought into the first transfer state, the main support frame 20 and the sub support frame 21 are arranged so that the directions of travel of parts of the endless belt 80 which are wound around them become the same direction, that is, so that the axial directions of the coupling rod 60 and the coupling rod 61 extend in parallel to each other. When changing over the belt junction conveyor 10 from the first transfer state to the second transfer state, the drive motor 70 is operated to rotate the rotating body 71 in a direction C. The coupling rod 72 is pulled by the rotation of the rotating body 71 in the direction C. The length of the coupling rod 72 is constant, and since the coupling rod 72 is coupled to the main support frame 20, the main support frame 20 is moved by the coupling rod 72 being pulled. Since the coupling rod 60 one end of which is axially coupled to the base frame 22 is fixed to the main support frame 20, the movement of the main support frame 20 is a rotation in a direction D about an end of the coupling rod 60 as the center of rotation (L1 in FIG. 3).

In contrast, the coupling rod 73 is pushed out by the rotation of the rotating body 71 in the direction C. By the coupling rod 73 being pushed out, the sub support frame 21 to which one end of the coupling rod 73 is coupled is moved. The sub support frame 21, to which the coupling rod 61 is coupled, rotates in a direction E about an end of the coupling rod 61 as the center of rotation (L1 in FIG. 3). When the main support frame 20 and the sub support frame 21 rotate in the direction opposite from each other by 30 degrees, the rotation of the rotating body 71 in the direction C is stopped, and the belt junction conveyor 10 is brought into the second transfer state (see FIG. 2).

When changing over the state of the belt junction conveyor 10 from the second transfer state to the first transfer state, the rotating body 71 rotates in a direction F by an activation of the drive motor 70. The coupling rod 72 is pushed out by the rotation of the rotating body 71 in the direction F and the main support frame 20 rotates in a direction G. In contrast, the coupling rod 73 is pulled by the rotation of the rotating body 71 in the direction F, and the sub support frame 21 rotates in a direction H. When the main support frame 20 and the sub support framed 21 rotate to the first transfer state, the operation of the drive motor 70 is stopped, and the rotations of the main support frame 20 and the sub support frame 21 are stopped. In this case as well, the main support frame 20 and the sub support frame 21 rotate in the direction opposite from each other by 30 degrees, respectively. When the activation of the drive motor 70 is operated in the direction F, and unlikely passes by without being stopped, the coupling rod 73 is brought into abutment with the rotating body 71. When the belt junction conveyor 10 is brought into the first transfer state, even when the drive motor 70 is erroneously operated and the rotating body 71 is caused to rotate in the direction F, the rotation is prevented because it is in abutment with the coupling rod 73.

By employing the servo motor as the drive motor configured as the change-over mechanism 23, the belt junction conveyor 10 can be changed at a high speed over between the first transfer state and the second transfer state, so that the products being transported can be assorted at a high speed and reliably even when they are transported at a high speed. In addition, since the change-over of the direction of transport by the transport belt part of the endless belt 80 is achieved only by rotating the main support frame 20 and the sub support frame 21, the products are prevented from being imparted with an impact when changing over the direction of transport, and, in addition, the products are prevented from being caught by or drawn into a clearance formed in an assorting device at the time of assortment, so that the stable and reliable assortment of the produces is achieved.

By employing a follow shaft motor as the drive motor 33 provided in the main support frame 20, a configuration for causing the drive pulley 30 to rotate can be simplified, and weight reduction of members to be mounted on the main support frame 20 is achieved. By forming at least an tubular portion of the end pulley 31 where the endless belt 80 is wound, of aluminum, the end pulley 31 which contributes most to the moment of inertia when the main support frame 20 rotates and is located at a farthest position from the center of rotation, reduction of the moment of inertia of the main support frame 20 is achieved, so that the load of the change-over mechanism 23 is significantly reduced.

By employing the redirecting pulleys 53 and 54, application of the load on the endless belt 80 when changing over the belt junction conveyor 10 between the first transfer state and the second transfer state is avoided in comparison with the case of using an end pipe which does not rotate so that reduction of the load applied on the drive motor 70 is reduced.

When the belt junction conveyor 10 is changed over between the first transfer state and the second transfer state, the endless belt 80 tends to meander due to the individual rotations of the redirecting pulleys 53 and 54. However, since the wheels 86 of the holder units 85 are brought into a state of being abutment with the thick edge parts 81 provided on the surface of the endless belt 80, the meandering of the endless belt 80 which may occur when the transfer state is changed over is restrained.

In the embodiment, an angle of 30 degrees is employed as an angle of rotation of the main support frame 20 and the sub support frame 21. However, the angle of rotation of these support frames is not limited to 30 degrees, and must simply fall within a range whereby the belt junction conveyor 10 can be changed over between the first transfer state and the second transfer state at a high speed and, may be within a range from 20 to 45 degrees.

In the embodiment, the drive shaft of the drive motor 70 which is included in the change-over mechanism 23 is mounted on the rotating body 71. However, it is also possible to provide a gear mechanism on the drive motor 70 and mount the rotating body 71 via the gear mechanism. With the provision of the gear mechanism, even when the performance of the drive motor 70 is low, the rotating body 71 can be rotated at a high speed, that is, the main support frame 20 and the sub support frame 21 can be rotated at a high speed.

In the embodiment, the holder units 85 are arranged so as to interpose both ends of the endless belt 80 at the positions where the imaginary lines extending orthogonally to the direction of travel of the belt intersect the belt edges therebetween. However, what is essential is to prevent the endless belt 80 from meandering when it travels when the belt junction conveyor 10 is changed over between the first transfer state and the second transfer state, and hence it is not necessarily have to arrange the holder units 85 so as to interpose the both ends of the endless belt 80 at the positions where imaginary lines extending orthogonally to the direction of travel of the belt intersect the belt edges therebetween and, for example, it is also possible to arrange at least one each of the holder unit 85 which is brought into abutment with the thick edge part 81 provided on the endless belt 80 at one end in the direction of the width and the holder unit 85 which is brought into abutment with the thick edge part 81 provided on the endless belt 80 at the other end in the direction of the width, such as to arrange the holder unit 85 which is brought into abutment with the thick edge part 81 provided on the endless belt 80 at the one end in the direction of the width and the holder unit 85 which is brought into abutment with the thick edge part 81 provided on the endless belt 80 at the other end in the direction of the width alternately in the direction of travel of the endless belt.

In addition, it is also possible to arrange the holder units 85 at positions in the vicinity of the redirecting rollers 53 and 54 so as to interpose both ends of the endless belt 80 respectively at positions where imaginary lines extending orthogonally to the direction of travel of the endless belt 80 intersect the belt edges therebetween, and arrange the holder units 85 which are brought into abutment with one of the thick edge parts 81 provided at the both ends of the endless belt 80 and the holder units 85 which are brought into abutment with the other one of the thick edge parts 81 alternately at positions in the vicinity of the rollers other than the redirecting rollers 53 and 54.

Although the two redirecting pulleys 53 and 54 are used as the two cylindrical members which redirect on the upstream side of the transport conveyor part in the description in the embodiment, the present invention is not limited thereto and, for example, two cylindrical pipes 91 and 92 or two cylindrical shafts may be employed as the two redirecting members. A case where the cylindrical pipes 91 and 92 are employed as the two redirecting members will be described. Portions having the same functions as those in the embodiment are designated by the same reference numerals, and description of the same portions as those in the embodiment will be omitted.

Figure 9:
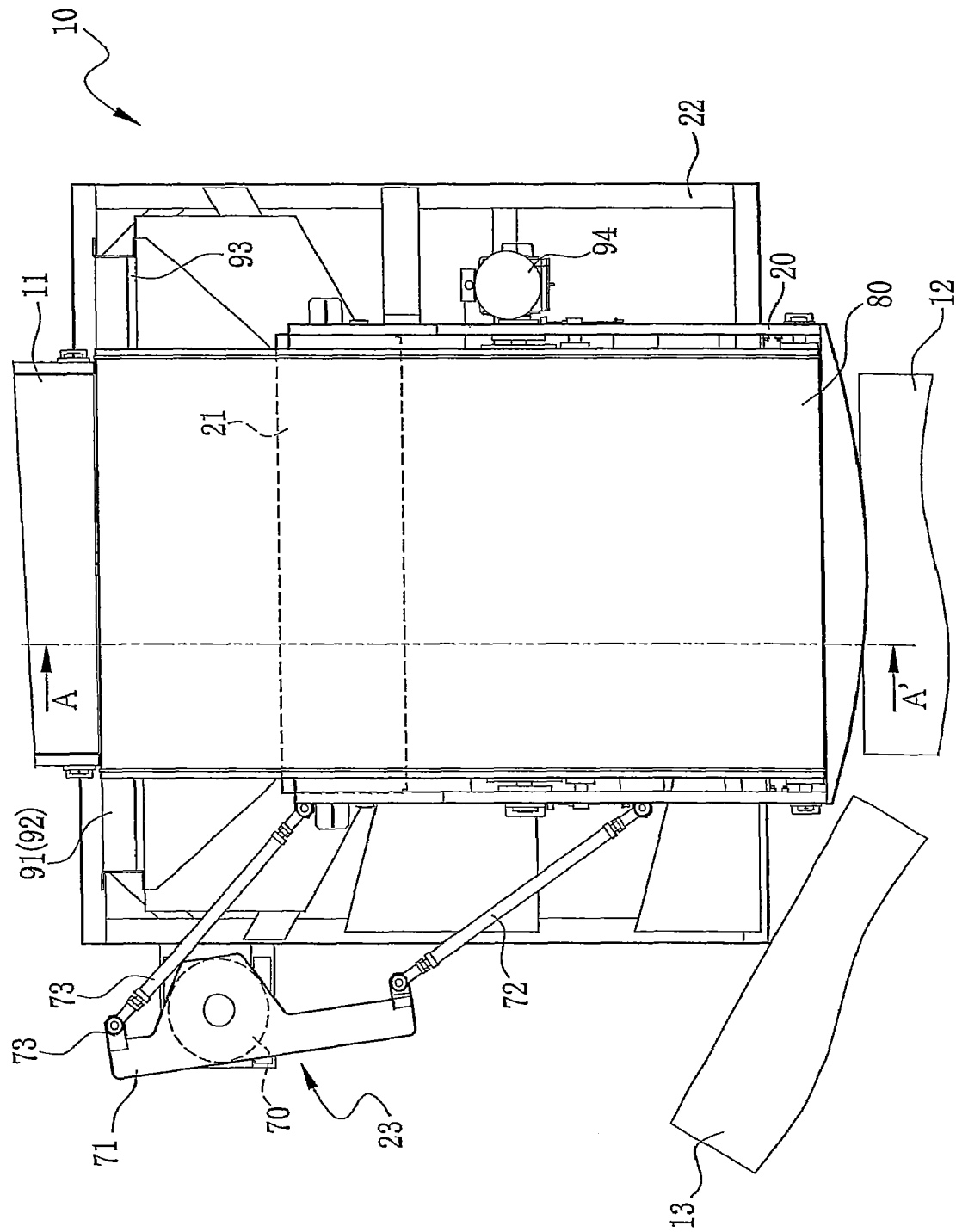
FIG. 9 is a top view showing the belt junction conveyor when a cylindrical pipe is used as a redirecting member.
Figure 10:
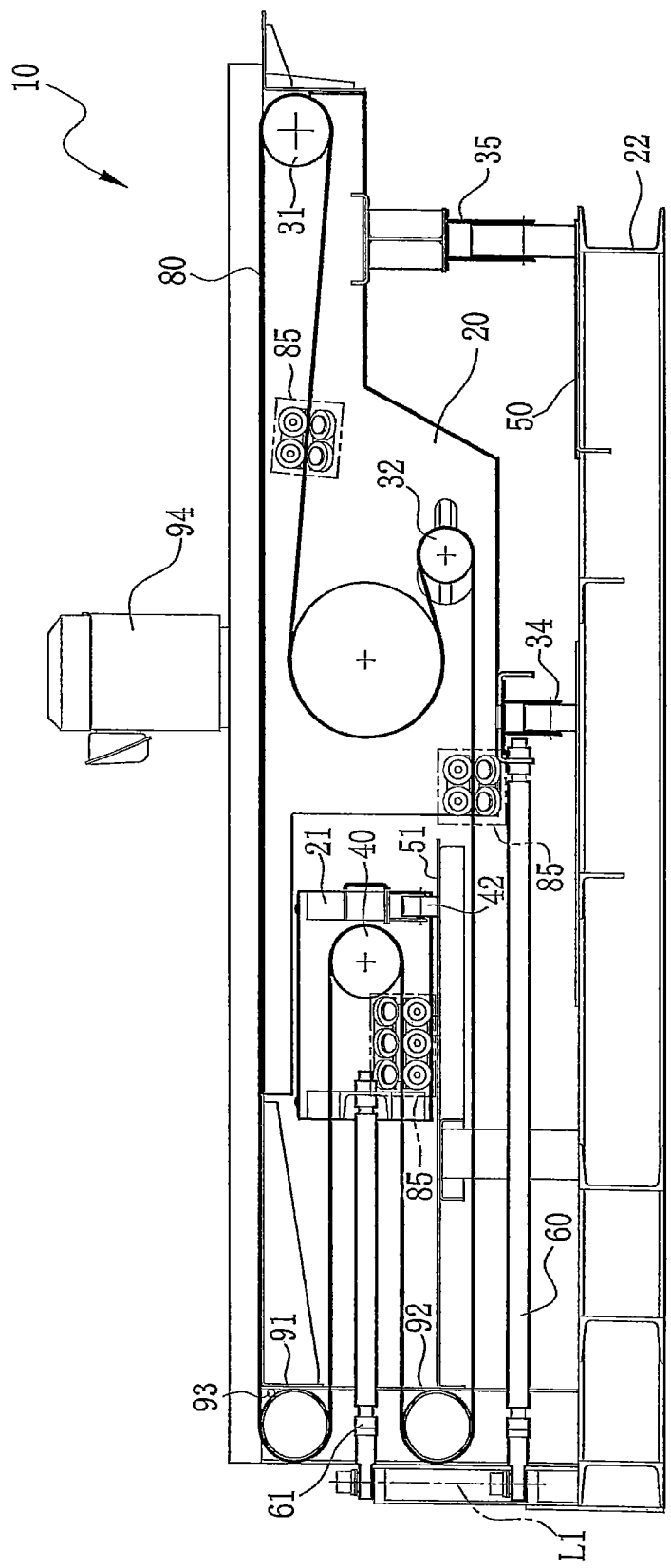
FIG. 10 is a cross-sectional view showing a configuration of the belt junction conveyor when the cylindrical pipe is used as the redirecting member.

As shown in FIG. 9 and FIG. 10, the two pipes (redirecting pipes) 91 and 92 are mounted on the base frame 22 as two redirecting members. The redirecting pipe 91 is arranged above the coupling rod 61, and the redirecting pipe 92 is arranged below the coupling rod 61. The redirecting pipes 91 and 92 are respectively fixed to the base frame 22 in a state in which brackets, not shown, are mounted on both ends thereof.

The redirecting pipe 91 which is arranged above the coupling rod 61 out of these redirecting pipes 91 and 92 is provided with an antivibration shaft 93 which comes into abutment with a peripheral surface of the redirecting pipe 91. If the belt junction conveyor 10 is changed over between the first transfer state and the second transfer state by the above-described change-over mechanism 23 while causing the endless belt 80 to travel by a drive motor 94, the endless belt 80 wound therearound is redirected by the redirecting pipes 91 and 92, thereby traveling while coming into sliding contact with the redirecting pipes 91 and 92. A belt tension of the endless belt 80 redirected by the redirecting pipe 91 is larger than a belt tension of the endless belt 80 redirected by the redirecting pipe 92, and hence vibrations generated on the redirecting pipe 91 when the main support frame 20 rotates and vibrations generated when the traveling endless belt 80 comes into sliding contact with the redirecting pipe 91 resonate. This resonance causes vibrations having a specific frequency that the entire redirected portion has, which is mainly affected by the redirecting pipe 91 including the both end brackets, and hence a large volume abnormal sound is generated when the belt junction conveyor 10 is driven.

Accordingly, by fixing the antivibration shaft 93 described above to the base frame 22 to keep the state in which the peripheral surface thereof is in abutment with the peripheral surface of the redirecting pipe 91, the above-described specific frequency of the redirected portion is significantly differentiated, and an amplitude of a center portion of the redirecting pipe 91 is reduced, so that above-described generation of the vibrations having the specific frequency generated in the redirecting pipe 91 can be prevented and, consequently, the abnormal sound generated when the belt junction conveyor 10 is driven is prevented.

The antivibration shaft 93 described above may be a shaft having the same length as the length of the redirecting pipe 91, or a plurality of shafts shorter than the length of the redirecting pipe 91 may be brought into abutment with the redirecting pipe 91. Although the cross-sectional shape of the shaft 93 is not mentioned, the cross-sectional shape may be a circular shape, an oval shape, and also a polygonal shape. In the description given above, the redirecting pipe 91 is exemplified as an object with which the antivibration shaft is brought into abutment. However, the antivibration shaft may be brought into abutment not only with the redirecting pipe 91, but also with the redirecting pipe 92.

As a method of preventing the abnormal sound generated in the redirecting pipe, there is a method of changing the weight of the redirecting pipe 91 by providing an opening or a notch on the peripheral surface of the redirecting pipe 91, for example, in addition to the method of bringing the antivibration shaft 93 into abutment with the redirecting pipe 91. By changing the weight of the redirecting pipe 91, the frequency of the vibrations generated in the redirecting pipe 91 when the main support frame 20 rotates is changed, so that the resonance with the vibrations generated when the traveling endless belt 80 comes into sliding contact with the redirecting pipe 91 is prevented.

When the redirecting pipes 91 and 92 in the cylindrical shape are used as the redirecting members as described above, a frictional force generated when the traveling endless belt 80 and the redirecting pipes 91 and 92 are in sliding contact is larger than the case of the redirecting pulleys 53 and 54 described in the embodiment and, in addition, since the endless belt 80 is extended between the end pulley 31 and the redirecting pipe 91, if the belt junction conveyor 10 is changed over between the first transfer state and the second transfer state while causing the endless belt 80 to travel, the traveling endless belt 80 can hardly meander in the vicinity of the redirecting pipe 91.

In this manner, since the endless belt 80 does not meander when the pipes 91 and 92 are used as the redirecting member, it is not necessary to arrange the holder units 85 between the end pulley 31 and the redirecting pipe 91 or between the redirecting pipe 91 and the tail pulley 40 any longer, the number of the holder units 85 to be arranged may be reduced.

Since the tensed state of the traveling endless belt 80 is weak between the end pulley 31 and the drive pulley 30, between the take-up pulley 32 and the redirecting pipe 92, and between the redirecting pipe 92 and the tail pulley 40, portions of the endless belt 80 traveling therebetween tend to meander. Therefore, when the redirecting pipes 91 and 92 are used as the redirecting member, the holder units 85 for preventing the traveling endless belt 80 from meandering are arranged between the end pulley 31 and the drive pulley 30, between the take-up pulley 32 and the redirecting pipe 92, and between the redirecting pipe 92 and the tail pulley 40 as in the embodiment.

In this case, the holder unit 85 may be arranged so as to interpose the both ends of the endless belt 80 at the positions where the imaginary lines extending orthogonally to the direction of travel of the endless belt 80 intersect the belt edges therebetween, or the holder units 85 which are brought into abutment with the thick edge part 81 provided on the endless belt 80 at one end in the direction of the width and the holder units 85 which are brought into abutment with the thick edge part 81 provided on the endless belt 80 at the other end in the direction of the width may be arranged alternately in the direction of travel of the endless belt 80.

When the cylindrical redirecting pipes 91 and 92 are used as the redirecting members, since the frictional force is generated between the traveling endless belt 80 and the redirecting pipes 91 and 92, so that a drive motor having higher power than the drive motor 33 used when the redirecting pulleys 53 and 54 are employed is used as the drive motor 94. Since the movement when the belt junction conveyor 10 is activated is the same as that in the embodiment, detailed description will be omitted here.

As described above, the cylindrical shafts may be employed in addition to the redirecting pipes 91 and 92 as the redirecting member. Although not shown, when the cylindrical shafts are used, even when the vibrations having different frequency from the first transfer state are generated between the redirecting part and the endless belt 80 when the belt junction conveyor 10 is driven, they are significantly different from the specific frequency due to the change in specific frequency of the entire redirecting part caused by the difference in material thickness of the shafts and that of the redirecting pipes, so that the abnormal sound caused by the vibrations at the specific frequency does not occur, whereby it is not necessary to mount the antivibration shaft 93 described above on the base frame 22.

In the embodiment, the casters 34, 35, and 42 are mounted respectively on the main support frame 20 and the sub support frame 21 for rotating the main support frame 20 or the sub support frame 21 at a small force and stably when the belt junction conveyor 10 is changed over between the first transfer state and the second transfer state. However, since a large number of parts such as the drive motor 33 or the drive motor 94 are mounted on the main support frame 20, there arises a problem of uplifting of the main support frame 20 from the first stage 50 provided in the base frame 22 by a centrifugal force generated at the time of rotation when the main support frame 20 being rotated by the switching between the first transfer state and the second transfer state is suddenly stopped.

Figure 11:
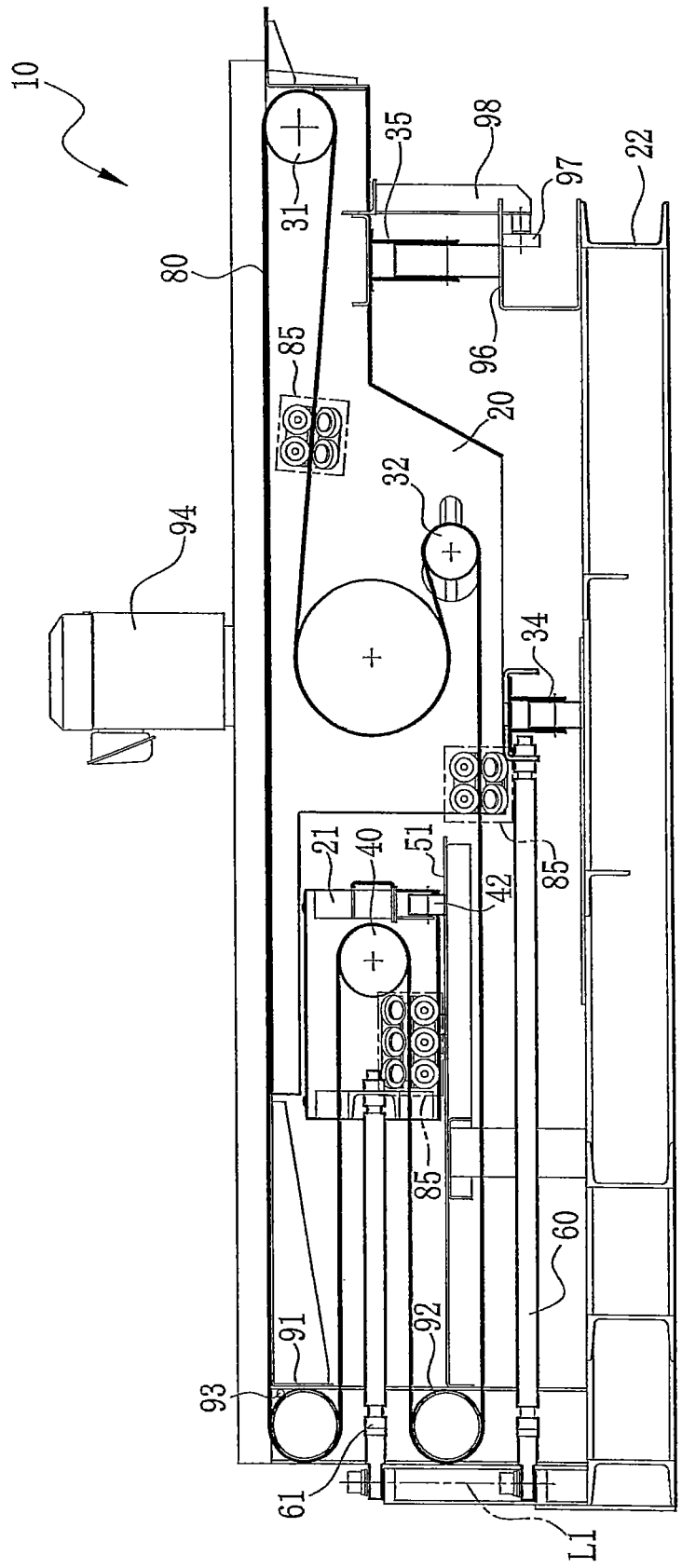
FIG. 11 is a cross-sectional view showing a configuration of the belt junction conveyor when an uplift prevention guide hole is provided on the main support frame.

In order to solve the problem as described above, an uplift prevention member for preventing the uplift of the main support frame 20 when the rotating main support frame 20 is stopped may be provided on a lower surface side of the stage 96 as shown in FIG. 11. As this uplift prevention member, for example, a guide wheel 97 is used, and the guide wheel 97 may be brought into abutment with the surface of a stage 96 on the opposite side from the upper surface of the stage 96. The guide wheel 97 is fixed to the main support frame 20 via a bracket 98. Accordingly, the uplift of the main support frame 20 generated when the rotating main support frame 20 is suddenly stopped is prevented. Although not shown, the stage 96 is formed into a shape based on a movement locus of the guide wheel 97 and the caster 35.

Although the guide wheel 97 is exemplified as the member for preventing the above-described uplift, the invention is not limited thereto, and it is also possible to provide a stopper which is brought into abutment with the lower surface of the stage 96 when the rotating main support frame 20 is stopped on the main support frame 20, or to provide a rail extending along the direction of rotation of the main support frame 20 and a guide groove for allowing the rail to be fitted therein for restraining the direction of movement of the main support frame on the main support frame and the base frame, respectively.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to exact construction and operation illustrated and described, and accordingly all suitable modifications and equivalents may be resorted to, falling within the scope thereof.

The invention claimed is:

1. A belt junction conveyor comprising:
   an endless belt formed with a transport conveyor part for assorting products to be transported;
   a drive pulley configured to cause the endless belt wound therearound to travel;
   two redirecting members configured to redirect the endless belt wound around the drive pulley on an upstream side of the transport conveyor part in a direction of transport of the products so as to position the transport conveyor part on an upper surface;
   a tail pulley around which the endless belt after having been redirected by the two redirecting members is wound;
   a main support frame on which the drive pulley is rotatably mounted;
   a sub support frame on which the tail pulley is rotatably mounted;
   a first coupling rod, one end of which is coupled to the main support frame;
   a second coupling rod, one end of which is coupled to the sub support frame;
   a base frame on which the two redirecting members are mounted and to which the first coupling rod and the second coupling rod are axially coupled in a coaxial manner, in which the second coupling rod is disposed between the two redirecting members; and
   a change-over mechanism configured to change over a direction of transport of the products on the transport conveyor part by rotating the main support frame and the sub support frame in the directions opposite from each other by a predetermined amount, wherein the change-over mechanism includes a drive motor configured to operate as an actuator, a rotating body configured to rotate by operation of the drive motor, a first coupling member configured to couple the rotating body and the main supporting frame, and a second coupling member configured to couple the rotating body and the sub supporting frame.

2. The belt junction conveyor according to claim 1, wherein the two redirecting members are each made up of redirecting pulleys, and the redirecting pulleys are rotatably mounted on the base frame.

3. The belt junction conveyor according to claim 1, wherein the two redirecting members are made up of either cylindrical pipes or cylindrical shafts, respectively.

4. The belt junction conveyor according to claim 3, wherein the base frame is provided with an antivibration member which is brought into abutment with at least one of the cylindrical pipes which is arranged above the second coupling rod when the two redirecting member are made up respectively of the cylindrical pipes.

5. The belt junction conveyor according to claim 1, wherein:
   the endless belt includes either semicircle salient parts or rounded thick edge parts on a surface which forms an upper surface of the transport conveyor part at both end edges in a direction of width of the endless belt, and is arranged with a plurality of holder units at positions in proximities of the end edges of the endless belt which is travelling; and
   the plurality of holder units are configured to limit a relative position between the endless belt and the main support frame with respect to a direction of a width of the endless belt and a relative position between the endless belt and the sub support frame with respect to the direction of the width of the endless belt by coming into abutment resiliently with thick edge parts and pressing the thick edge parts to end edge sides in the direction of the width of the endless belt to restrain meandering of the endless belt generated when the direction of transport of the products on the transport conveyor part is changed over.

6. The belt junction conveyor according to claim 1, wherein:
   the endless belt includes either semicircle salient parts or rounded thick edge parts on a surface which forms an upper surface of the transport conveyor part at both end edges in a direction of width of the endless belt, and is arranged with at least one of holder units each at a position in a proximity of the one end edge and at a position in a proximity of the other end edge of the endless belt which is travelling; and the holder units are configured to limit a relative position between the endless belt and the main support frame with respect to a direction of a width of the endless belt and a relative position between the endless belt and the sub support frame with respect to the direction of the width of the endless belt by coming into abutment resiliently with any one of thick edge parts provided at both end edges in the direction of the width of the endless belt and pressing the thick edge part to end edge sides in the direction of the width of the endless belt to restrain meandering of the endless belt generated when the direction of transport of the products on the transport conveyor part is changed over.

7. The belt junction conveyor according to claim 1, wherein the drive pulley is rotated by a motor having a follow shaft, in which a center shaft of the drive pulley is fitted.

8. The belt junction conveyor according to any one of claim 1, wherein the main support frame further includes an end pulley around which the endless belt is wound at an end opposite from the end where the redirecting member is arranged out of both ends of the transport conveyor part in a direction of transport of the products in addition to the drive pulley, and a portion of the end pulley where at least the endless belt is wound is formed of aluminum material.

9. The belt junction conveyor according to claim 2, wherein
the endless belt includes either semicircle salient parts or rounded thick edge parts on a surface which forms an upper surface of the transport conveyor part at both end edges in a direction of width of the endless belt, and is arranged with at least one of holder units each at a position in a proximity of the one end edge and at a position in a proximity of the other end edge of the endless belt which is travelling; and the holder units are configured to limit a relative position between the endless belt and the main support frame with respect to a direction of a width of the endless belt and a relative position between the endless belt and the sub support frame with respect to the direction of the width of the endless belt by coming into abutment resiliently with any one of thick edge parts provided at both end edges in the direction of the width of the endless belt and pressing the thick edge part to end edge sides in the direction of the width of the endless belt to restrain meandering of the endless belt generated when the direction of transport of the products on the transport conveyor part is changed over.

10. The belt junction conveyor according to claim 3, wherein:
the endless belt includes either semicircle salient parts or rounded thick edge parts on a surface which forms an upper surface of the transport conveyor part at both end edges in a direction of width of the endless belt, and is arranged with at least one of holder units each at a position in a proximity of the one end edge and at a position in a proximity of the other end edge of the endless belt which is travelling; and the holder units are configured to limit a relative position between the endless belt and the main support frame with respect to a direction of a width of the endless belt and a relative position between the endless belt and the sub support frame with respect to the direction of the width of the endless belt by coming into abutment resiliently with any one of thick edge parts provided at both end edges in the direction of the width of the endless belt and pressing the thick edge part to end edge sides in the direction of the width of the endless belt to restrain meandering of the endless belt generated when the direction of transport of the products on the transport conveyor part is changed over.

11. The belt junction conveyor according to claim 4, wherein:
the endless belt includes either semicircle salient parts or rounded thick edge parts on a surface which forms an upper surface of the transport conveyor part at both end edges in a direction of width of the endless belt, and is arranged with at least one of holder units each at a position in a proximity of the one end edge and at a position in a proximity of the other end edge of the endless belt which is travelling; and the holder units are configured to limit a relative position between the endless belt and the main support frame with respect to a direction of a width of the endless belt and a relative position between the endless belt and the sub support frame with respect to the direction of the width of the endless belt by coming into abutment resiliently with any one of thick edge parts provided at both end edges in the direction of the width of the endless belt and pressing the thick edge part to end edge sides in the direction of the width of the endless belt to restrain meandering of the endless belt generated when the direction of transport of the products on the transport conveyor part is changed over.

12. The belt junction conveyor according to claim 2, wherein:
the endless belt includes either semicircle salient parts or rounded thick edge parts on a surface which forms an upper surface of the transport conveyor part at both end edges in a direction of width of the endless belt, and is arranged with at least one of holder units each at a position in a proximity of the one end edge and at a position in a proximity of the other end edge of the endless belt which is travelling; and the holder units are configured to limit a relative position between the endless belt and the main support frame with respect to a direction of a width of the endless belt and a relative position between the endless belt and the sub support frame with respect to the direction of the width of the endless belt by coming into abutment resiliently with any one of thick edge parts provided at both end edges in the direction of the width of the endless belt and pressing the thick edge part to end edge sides in the direction of the width of the endless belt to restrain meandering of the endless belt generated when the direction of transport of the products on the transport conveyor part is changed over.

13. The belt junction conveyor according to claim 3, wherein
the endless belt includes either semicircle salient parts or rounded thick edge parts on a surface which forms an upper surface of the transport conveyor part at both end edges in a direction of width of the endless belt, and is arranged with at least one of holder units each at a position in a proximity of the one end edge and at a position in a proximity of the other end edge of the endless belt which is travelling; and the holder units are configured to limit a relative position between the endless belt and the main support frame with respect to a direction of a width of the endless belt and a relative position between the endless belt and the sub support frame with respect to the direction of the width of the endless belt by coming into abutment resiliently with any one of the thick edge parts provided at both end edges in the direction of the width of the endless belt and pressing the thick edge part to end edge sides in the direction of the width of the endless belt to restrain meandering of the endless belt generated when the direction of transport of the products on the transport conveyor part is changed over.

14. The belt junction conveyor according to claim 4, wherein the endless belt includes either semicircle salient parts or rounded thick edge parts on a surface which forms an upper surface of the transport conveyor part at both end edges in a direction of width of the endless belt, and is arranged with at least one of holder units each at a position in a proximity of the one end edge and at a position in a proximity of the other end edge of the endless belt which is travelling; and the holder units are configured to limit a relative position between the endless belt and the main support frame with respect to a direction of a width of the endless belt and a relative position between the endless belt and the sub support frame with respect to the direction of the width of the endless belt by coming into abutment resiliently with any one of thick edge parts provided at both end edges in the direction of the width of the endless belt and pressing the thick edge part to end edge sides in the direction of the width of the endless belt to restrain meandering of the endless belt generated when the direction of transport of the products on the transport conveyor part is changed over.

* * * * *